F. RHIND.
METHOD OF BLOWING GLASS-SPHERES.
No. 169,479. Patented Nov. 2, 1875.
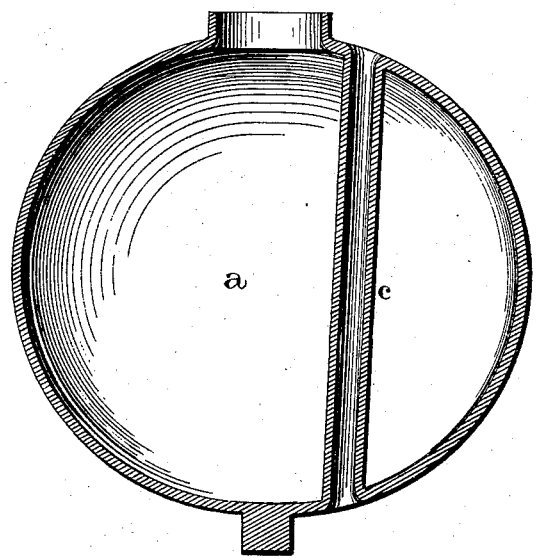
WITNESSES.
J. Wm Garner,
W. J. Murphy
INVENTOR.
Frank Rhind
per
F. A. Lehmann, Atty

UNITED STATES PATENT OFFICE.

FRANK RHIND, OF BROOKLYN, NEW YORK, ASSIGNOR OF TWO-THIRDS HIS RIGHT TO JANE E. SMITH, OF CRANFORD, NEW JERSEY, AND KEYES P. COOL, OF GLEN FALLS, NEW YORK.

IMPROVEMENT IN METHODS OF BLOWING GLASS SPHERES.

Specification forming part of Letters Patent No. 169,479, dated November 2, 1875; application filed September 3, 1875.

*To all whom it may concern:*

Be it known that I, FRANK RHIND, of Brooklyn, in the county of Kings and State of New York, have invented certain new and useful Improvements in Methods of Forming Open Tubes through Glass Vessels; and I do hereby declare the following to be a full, clear, and exact description of the invention, such as will enable others skilled in the art to which it pertains to make and use it, reference being had to the accompanying drawings which form part of this specification.

My invention relates to a method of forming open tubes through glass vessels; and it consists in extending through the molds a rod, around which the glass is blown so as to form with the vessel, in a single piece, a tube open at both ends, which extends through the vessel in any desired direction.

The accompanying drawings represent my invention.

*a* represents a vessel of any suitable kind or form, through which passes the tube *c* formed in one solid piece with the vessel. In the mold for blowing the vessel is formed a hole, through which hole in the mold is passed a rod of any desired thickness or shape. The melted glass is inserted through the neck of the mold, so as to rest upon the top of this rod until it falls over on all sides to the bottom, and then the vessel is blown, thus forming both the vessel and the tube at the same time, and in a single piece.

I am aware that lamp-bowls have been formed having a tube, open at both ends, extending up through or into the center of the bowl, but connected thereto only at the base, and this I disclaim. My tubes are formed at one side of the center, and are connected with the bowl at both of its ends.

Having thus described my invention, I claim—

1. The method herein described of blowing open tubes through glass vessels, substantially as specified.

2. A new article of manufacture—a glass vessel having a tube open at each end and connected to the bowl at both top and bottom, the bowl and tube being blown together, substantially as specified.

In testimony that I claim the foregoing I have hereunto set my hand this 8th day of July, 1874.

FRANK RHIND.

Witnesses:
 JAMES C. CLOYD,
 BENJAMIN H. BAYLISS.